US006600124B1

(12) United States Patent
Yamat

(10) Patent No.: US 6,600,124 B1
(45) Date of Patent: Jul. 29, 2003

(54) SAFETY INTERLOCK BETWEEN A VACUUM INTERRUPTER AND A DISCONNECT SWITCH

(75) Inventor: Miguel Bonifacio Yamat, North Royalton, OH (US)

(73) Assignee: McGraw-Edison Company, Houston, TX (US)

( * ) Notice: Subject to any disclaimer, the term of this patent is extended or adjusted under 35 U.S.C. 154(b) by 0 days.

(21) Appl. No.: 09/794,403

(22) Filed: Feb. 28, 2001

(51) Int. Cl.[7] .................................................. H01M 3/00
(52) U.S. Cl. ........................ 218/154; 218/120; 218/140
(58) Field of Search .............................. 218/154, 7, 14, 218/78, 84, 120, 140, 153; 200/400–401

(56) References Cited

U.S. PATENT DOCUMENTS

| | | | | | |
|---|---|---|---|---|---|
| 4,283,610 | A | * | 8/1981 | Date et al. | 218/154 |
| 4,484,046 | A | * | 11/1984 | Neuhouser | 218/154 |
| 5,483,032 | A | | 1/1996 | Trayer et al. | |
| 5,504,293 | A | * | 4/1996 | Rogers et al. | 218/154 |

OTHER PUBLICATIONS

Trayer Engineering Corporation, Tri–Phase Visibile Disconnect Vacuum Switchgear, May 1, 1998.
Trayer Engineering Corporation, "Product Line Overview" (no date).

* cited by examiner

*Primary Examiner*—Lincoln Donovan
(74) *Attorney, Agent, or Firm*—Fish & Richardson P.C.

(57) ABSTRACT

An interlock mechanism ensures that a first switch does not switch to a first position unless a second switch is in a second position and that the second switch does not switch from the second position while the first switch is in the first position. The interlock mechanism includes a moveable body with a notch configured to associate a position of the moveable body with a switching of the second switch. The associated position of the moveable body locates the notch in an engagement position when the switch is in a second position and locates the notch out of the engagement position when the switch is not in the second position. The interlock mechanism also includes a rod structured and arranged to engage the notch of the moveable body when the first switch is in a first position and to disengage the notch of the moveable body when the first switch is switched from a first position. When the rod engages the notch of the moveable body the rod blocks movement of the moveable body in a first direction thus preventing the second switch from switching from a second position, and when the notch of the moveable body is not in the engagement position then the rod may not engage the notch and the first switch is prevented from switching to a first position.

19 Claims, 11 Drawing Sheets

SAFETY INTERLOCK BETWEEN A VACUUM INTERRUPTER AND A DISCONNECT SWITCH

TECHNICAL FIELD

This invention relates to high voltage electrical switchgear.

BACKGROUND

For safety considerations, an open circuit is visually verified before work is performed on a high voltage power distribution system. An open circuit may be created by high voltage load interrupters (switches) that use oil or vacuum as the interrupting medium. Vacuum switches have extremely long lifetimes and are resistant to degradation caused by electrical arcing. However, the contacts of a vacuum switch are contained in a sealed ceramic bottle and the on/off state of the vacuum switch cannot be visually verified.

Visual verification may be provided using oil switches. Oil switches are often designed and placed near a window in an oil filled tank to provide the required visual open circuit. Nevertheless, oil switches may sustain damage if used to switch load currents. For example, electrical arcing in an oil switch may seriously degrade the oil switch by reducing the insulative properties of the oil, as well as by creating explosive gases. Also, electrical arcing may carbonize the oil, which may cause it to become opaque over time and defeat the ability to visually verify an open circuit.

SUMMARY

In one general aspect, an interlock mechanism ensures that a first switch does not switch to a first position unless a second switch is in a second position and that the second switch does not switch from the second position while the first switch is in the first position. The interlock mechanism includes a moveable body with a notch configured to associate a position of the moveable body with a switching of the second switch. The associated position of the moveable body locates the notch in an engagement position when the switch is in the second position and locates the notch out of the engagement position when the switch is not in the second position. The interlock mechanism also includes a rod structured and arranged to engage the notch of the moveable body when the first switch is in the first position and to disengage the notch of the moveable body when the first switch is switched from the first position. When the rod engages the notch of the moveable body, the rod blocks movement of the moveable body in a first direction and prevents the second switch from switching from the second position. When the notch of the moveable body is not in the engagement position, the rod may not engage the notch and the first switch is prevented from switching to the first position.

Implementations may include one or more of the following features. For example, the first switch may include a primary vacuum switch, and the first position of the first switch may correspond to a closed position of the primary vacuum switch. The second switch may include, for example, a secondary safety switch (e.g., an oil immersed switch), and the second position of the second switch may correspond to a closed position of the secondary safety switch. Both the primary vacuum switch and the secondary safety switch may be switchable between an open position and a closed position.

A high voltage switchgear may exhibit both the long operational life of a vacuum switch and the visual verification of an oil switch by incorporating the interlock mechanism in conjunction with an oil switch in series with a vacuum switch. In a high voltage switchgear so configured, the vacuum switch performs the primary switching function, while the oil switch performs a secondary switching function. The interlock mechanisms ensures that the vacuum switch is switched under load conditions and the oil switch is switched after the load has been removed by the vacuum switch or before the load is restored by the vacuum switch. The ability to view the on/off status of the contacts of the oil switch is preserved by using the interlock mechanism to prevent arcing when the oil switch is switched.

In one implementation, the moveable body of the interlock mechanism may include a rotatable cylinder or an annular cam connected to a rotatable shaft. In either case, the notch may include an approximately radial notch into the rotatable cylinder or the annular cam. The notch in the cylinder or the annular cam may be structured and arranged to present approximately a right angle to the rod. The rod may include a rod rotatably attached to a pivot point at a first end and structured and arranged to rotate into or out of the notch when the notch is in an engagement position.

In another implementation, the moveable body includes a planar body structured and arranged to move longitudinally. The planar body may include a first planar surface that is oriented toward the rod, and the first planar surface may include the notch. There also may be a second surface of the planar body that includes drive teeth. The drive teeth may engage a drive gear sprocket to induce longitudinal motion of the planar body.

The notch in the planar body may include an indentation in the first planar surface of the planar body, with the indentation being structured and arranged to engage the rod. The notch also may include a cut-through in the first surface of the planar body that extends through a thickness of the planar body and that is structured and arranged to engage the rod. The rod may be structured and arranged to move essentially perpendicularly to the planar body and into and out of the notch when the notch is in an engagement position.

In yet another variation, the planar body includes a longitudinal slot in the first planar surface of the planar body. The slot is structured and configured to receive the rod, and includes a section of the slot with a lateral notch structured and arranged to engage the rod. The rod may be structured and arranged to move laterally with respect to a longitudinal direction of motion of the planar body and the slot. This may allow the rod to move into and out of the notch when the notch is in the engagement position.

A first switching mechanism may be structured and arranged to switch the first switch, and a linkage mechanism may be provided to link the movement of the rod to the operation of the first switch. A second switching mechanism may be structured and arranged to switch, the second switch and a linkage mechanism may be provided to link the movement of the moveable body to the operation of the second switch, such as, for example a stub shaft of the second switch.

Other features and advantages will be apparent from the description, the drawings, and the claims.

DESCRIPTION OF DRAWINGS

Like reference symbols in the various drawings indicate like elements.

DETAILED DESCRIPTION

For illustrative purposes, a safety interlock mechanism is described that couples together switching components of a primary high voltage switch in series with a secondary safety switch to prevent switching a load using the secondary safety switch. For clarity of exposition, the description begins with an account of switching mechanisms of the primary high voltage switch and the secondary safety switch. The operation of an implementation of a secondary safety switch also is explained, followed by a detailed account of a mechanism to interlock the operation of the primary high voltage switch and the secondary safety switch. With respect to each, the discussion proceeds from general elements of the mechanisms, and their high level relationships, to a detailed account of illustrative roles, configurations, and components of the elements.

Figure 1:
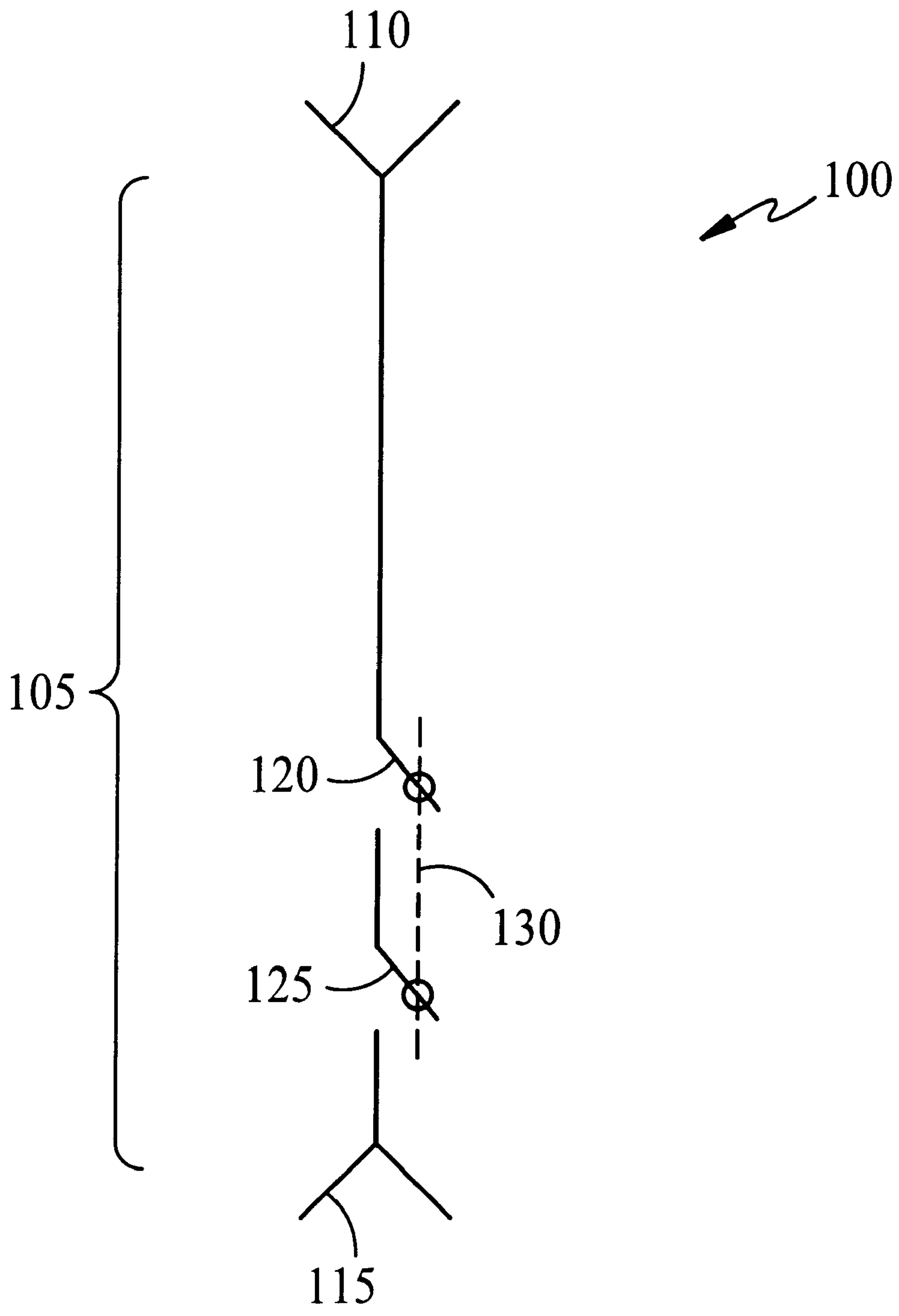
FIG. 1 is a schematic diagram of a high voltage electrical switchgear using a secondary safety switch interlocked with a series primary high voltage switch to provide a visible contact break.

Referring to FIG. 1, a high-voltage switchgear 100 defines an electrical path 105 between a tap 110 and a source 115. The electrical path 105 includes a primary high voltage switch 120 (e.g., a vacuum load switch) in series with a secondary safety switch 125 (e.g., a load break, oil-immersed switch). The primary high voltage switch 120 and the secondary safety switch 125 are coupled together by a safety interlock mechanism 130 that prevents the electrical path 105 from being open or closed ("switching the load") using the secondary safety switch 125.

Figure 2A:
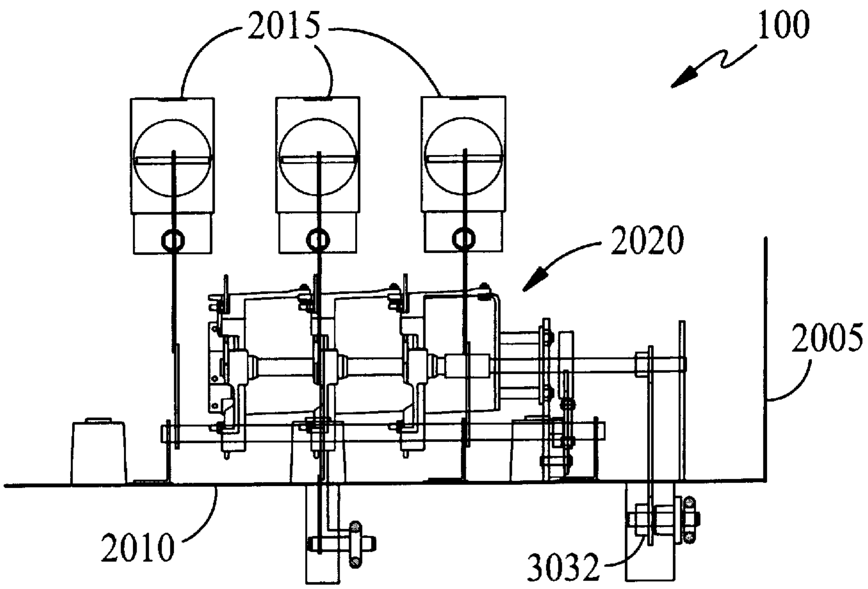
FIGS. 2A and 2B are schematic drawings of a top view and front view, respectively, of a high voltage switchgear including a cam-type safety interlock mechanism in which a safety switch is operable by a lever handle located on a front plate of the tank.
Figure 2B:
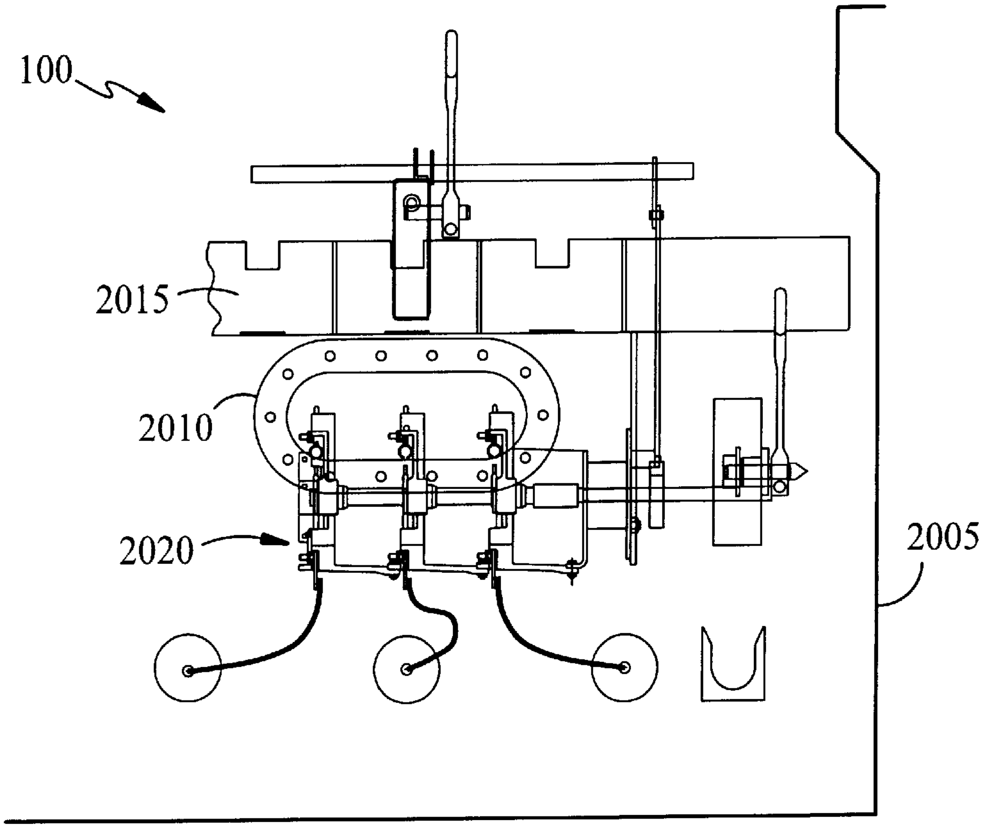

FIGS. 2A and 2B illustrate an implementation of a high voltage switchgear 100 that includes a tank 2005 containing a body of insulating medium (e.g., high voltage switching oil, air, sulfur hexaflouride gas). The tank 2005 also includes a window 2010 to provide visibility to the interior of the tank 2005 from outside of the tank 2005. Mounted within the tank 2005 and surrounded by the insulating medium are a vacuum switch 2015 (the primary high voltage switch) connected in series to a safety switch 2020. The safety switch 2020 may be located within the tank 2005 to be visible through the tank window 2010.

Figure 3:
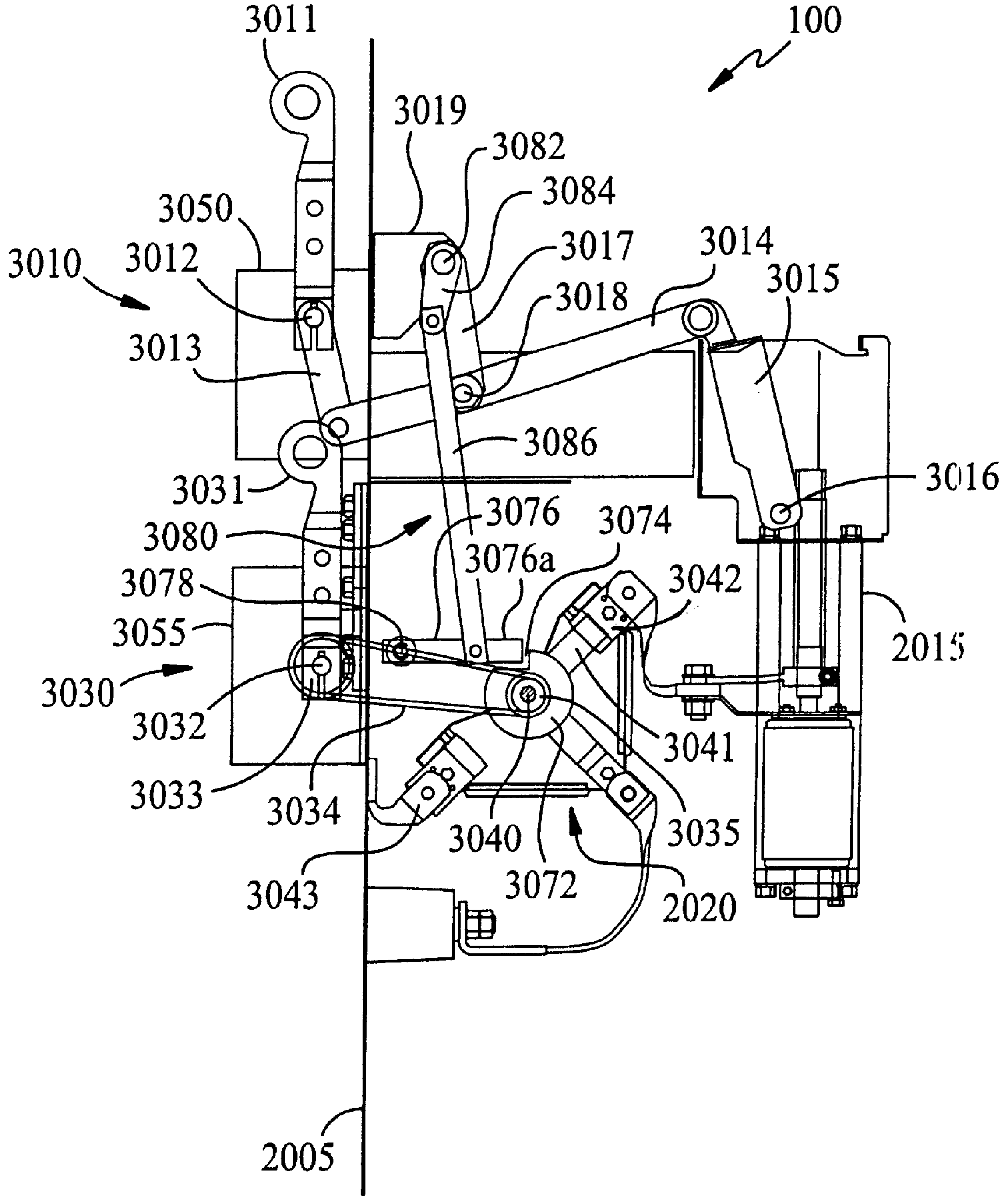
FIG. 3 is a schematic drawing of a side view of a high voltage switchgear including a cam-type safety interlock mechanism, a closed vacuum switch, and a closed safety switch that is operable by a lever handle.

Referring to FIG. 3, the vacuum switch 2015 and the safety switch 2020 each may be configured to be toggled through the operation of a separate switching mechanism 3010, 3030. The switching mechanisms 3010, 3030, may include lever handles 3011, 3031 external to the tank 2005. To accommodate the lever handles 3011, 3031, the tank 2005 also may include one or more outwardly projecting structures 3050, 3055 ("doghouses") open to the interior of the tank 2005 and defining a portion of the space occupied by the insulating medium.

A vacuum switching mechanism 3010 may include a vacuum lever handle 3011 configured to toggle the vacuum switch 2015. The vacuum lever handle 3011 may be non-rotatably connected to a first vacuum shaft 3012. The first vacuum shaft may pass through a sideplate of a first vacuum doghouse 3050 and may be rotatably mounted within the interior of the first vacuum doghouse 3050. A first vacuum link 3013 may connect to the first vacuum shaft 3012. The first vacuum link 3013 also may connect to a second vacuum link 3014 that may connect to a vacuum switch toggle link 3015 connected to the vacuum switch 2015 at a vacuum switch pivot point 3016. A vacuum stay link 3017 may pivotally link an intermediate point 3018 on the length of the second vacuum link 3014 to a support bracket 3019 that may be mounted to a wall of the tank 2005.

Figure 4:
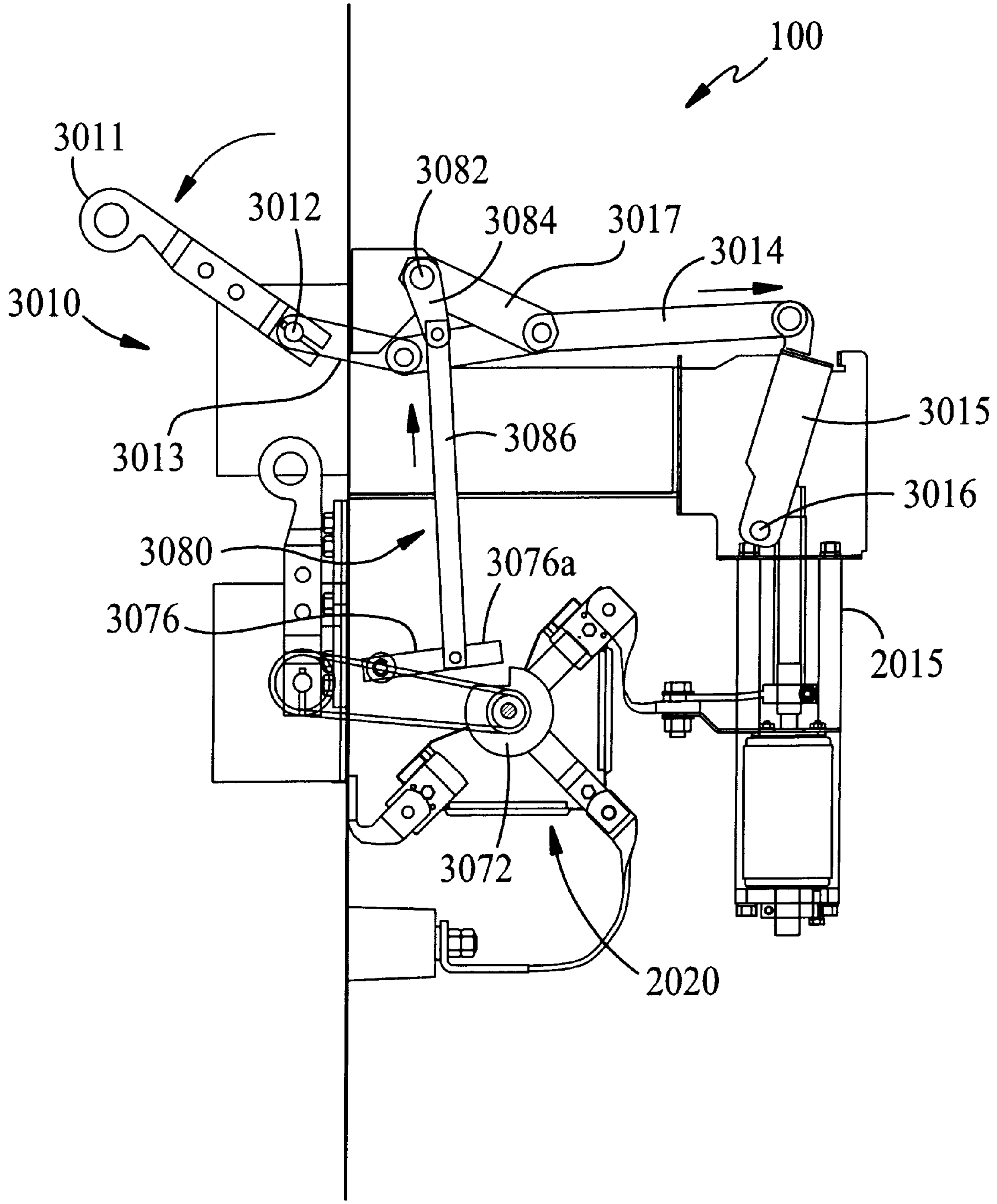
FIG. 4 is a schematic drawing of a side view of a high voltage switchgear including a cam-type safety interlock mechanism, an open vacuum switch, and a closed safety switch that is operable by a lever handle.

Referring to FIG. 4, the vacuum lever handle 3011 may be rotated downward. This causes the first vacuum shaft 3012 to rotate in a counterclockwise direction, which, in turn, causes the first vacuum link 3013 to rotate counterclockwise and outward/upward. The rotation of the first vacuum link 3013 induces the second vacuum link 3014 to move generally toward the vacuum switch 2015, which, in turn, causes the vacuum switch toggle link 3015 to rotate in clockwise fashion about the vacuum switch pivot point 3016 through which the vacuum switch toggle link 3015 is connected to the vacuum switch 2015. This, in turn, causes the vacuum switch 2015 to toggle to an open state.

Figure 5:
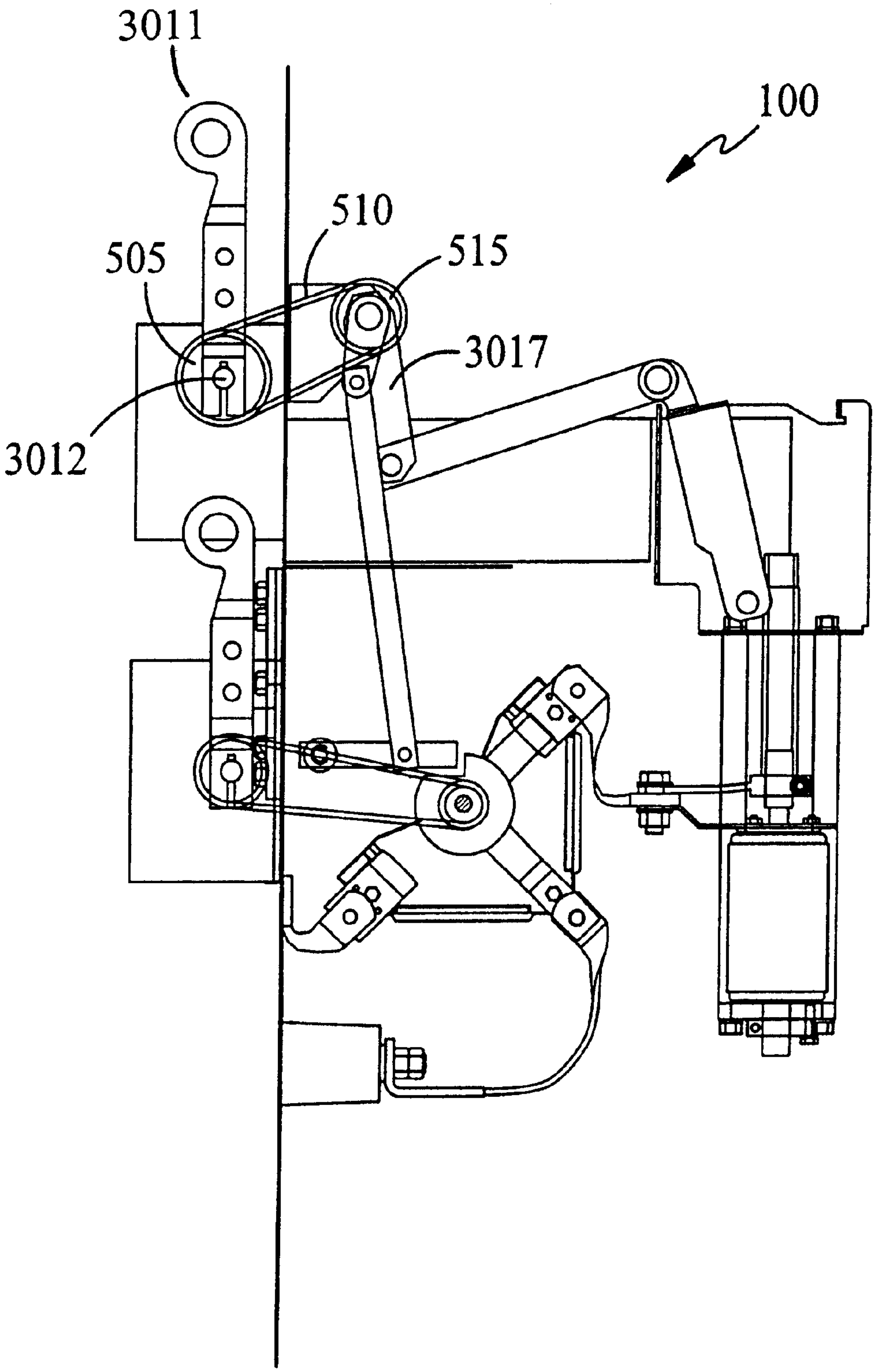
FIG. 5 is a schematic drawing of a side view of a high voltage switchgear including a cam-type safety interlock mechanism, a closed vacuum switch operable by a lever handle with a chain drive, and a closed safety switch that is operable by a lever handle.

Alternatively, referring to FIG. 5, the vacuum lever handle 3011 may be non-rotatably attached to the first vacuum shaft 3012 and the first vacuum shaft 3012, may include a first vacuum sprocket gear 505. In this implementation, a drive chain 510 couples rotation of the first vacuum shaft 3012 to the vacuum stay link 3017, which includes a non-rotatably attached second vacuum sprocket gear 515.

Referring again to FIG. 3, a safety switching mechanism 3030 includes a safety lever handle 3031 configured to toggle the safety switch 2020. The safety lever handle 3031 also is non-rotatably connected to a first safety shaft 3032. The first safety shaft 3032 passes through a sideplate of a first safety doghouse 3055 and is rotatably mounted in the interior of the first safety doghouse 3055. The first safety shaft 3032 also includes a first safety sprocket gear 3033 about which a safety drive chain 3034 runs. The safety drive chain 3034 connects to a second safety sprocket gear 3035 that is connected to a stub shaft 3040 of the safety switch 2020.

The stub shaft 3040 includes an electrical contact 3041 that is radially mounted on the stub shaft 3040 and is configured to rotate into or out of contact with other electrical contacts (e.g., contacts 3042, 3043) as the stub shaft 3040 is rotated. The other electrical contacts 3042, 3043 are mounted radially about the stub shaft 3040, but at a distance from the stub shaft 3040 and not in contact with the stub shaft 3040. The other contacts include a contact to an electrical path to a vacuum switch 3042 and/or a contact to an electrical path to ground 3043, e.g., to the casing of the tank 2005.

Figure 6:
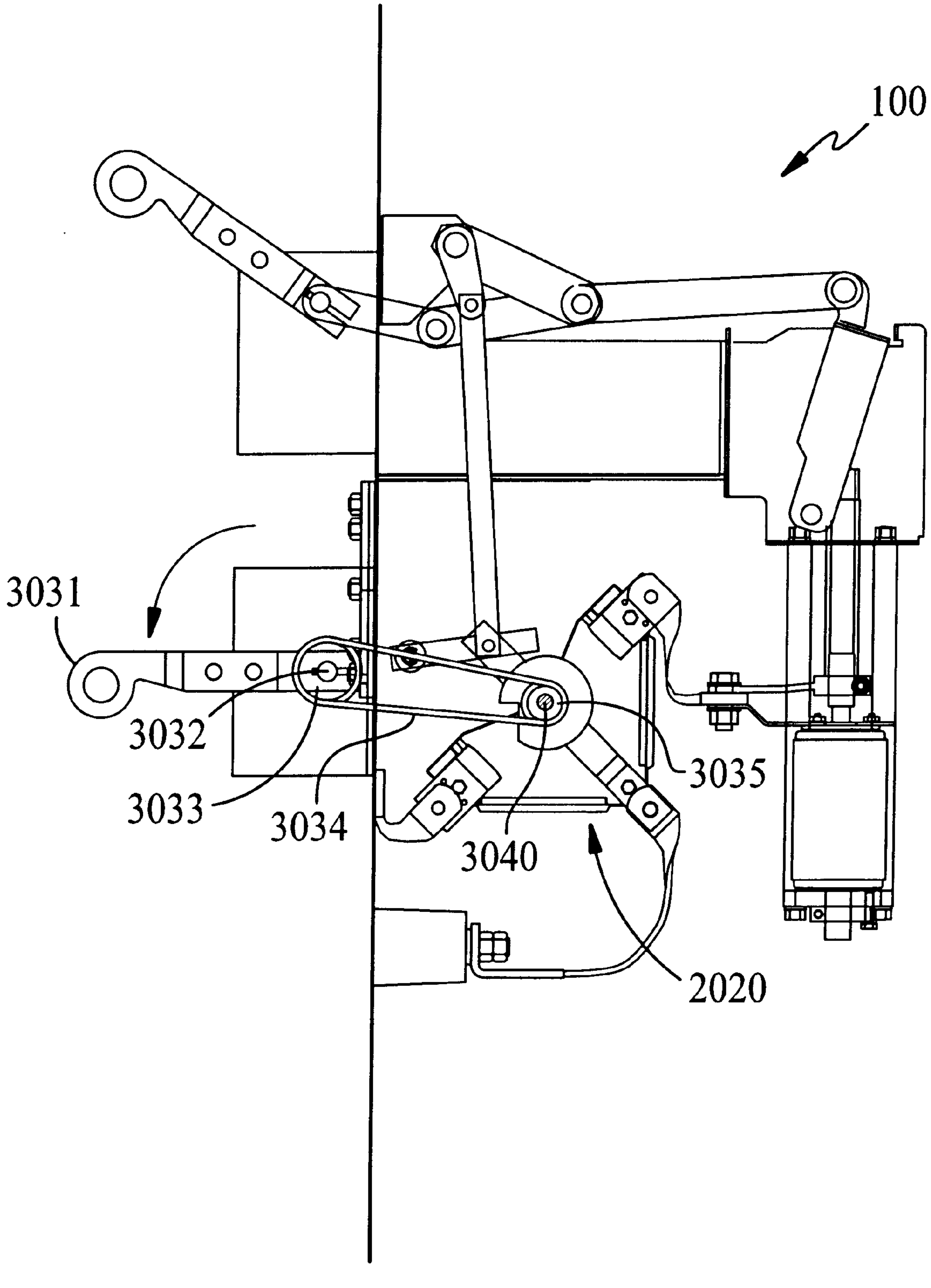
FIG. 6 is a schematic drawing of a side view of a high voltage switchgear including a cam-type safety interlock mechanism, an open vacuum switch, and an open safety switch operable by a lever handle.

Referring to FIG. 6, the safety switch 3031 may be configured so that rotation of the stub shaft 3040 causes the safety switch 2020 to open or close. For example, the safety lever handle 3031 may be rotated downward from its closed position to cause a counterclockwise rotation in the first safety shaft 3032. The counterclockwise rotation of the first safety shaft 3032 is transferred to the stub shaft 3040 through the safety sprocket gear 3033, 3035 and the safety drive chain 3034 mechanism, which causes the safety switch 2020 to move from a closed position to an open position.

Figure 7A:
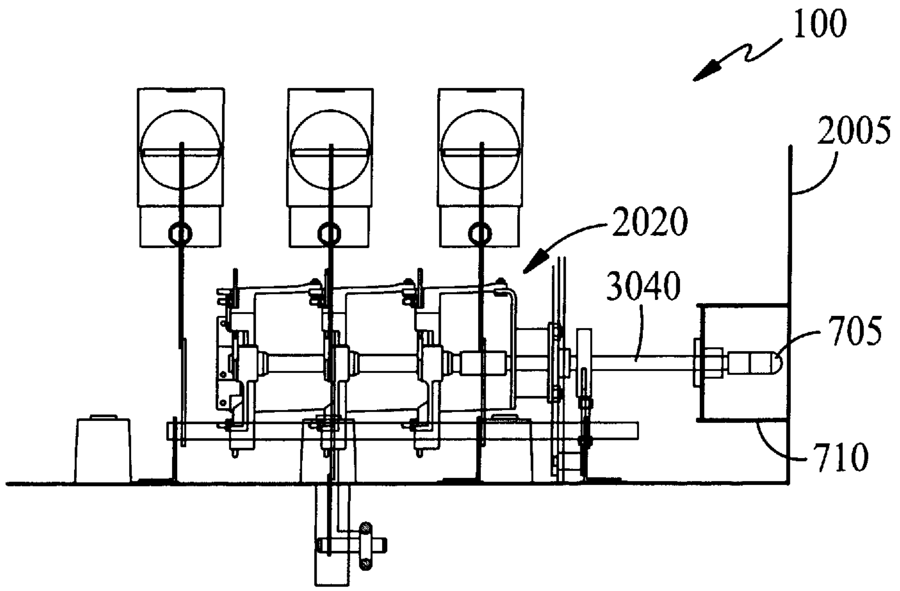
FIGS. 7A and 7B are schematic drawings of a top view and front view, respectively, of a high voltage switchgear including a cam-type safety interlock mechanism in which a safety switch is operable by a rotary handle located on a side plate of the tank.
Figure 7B:
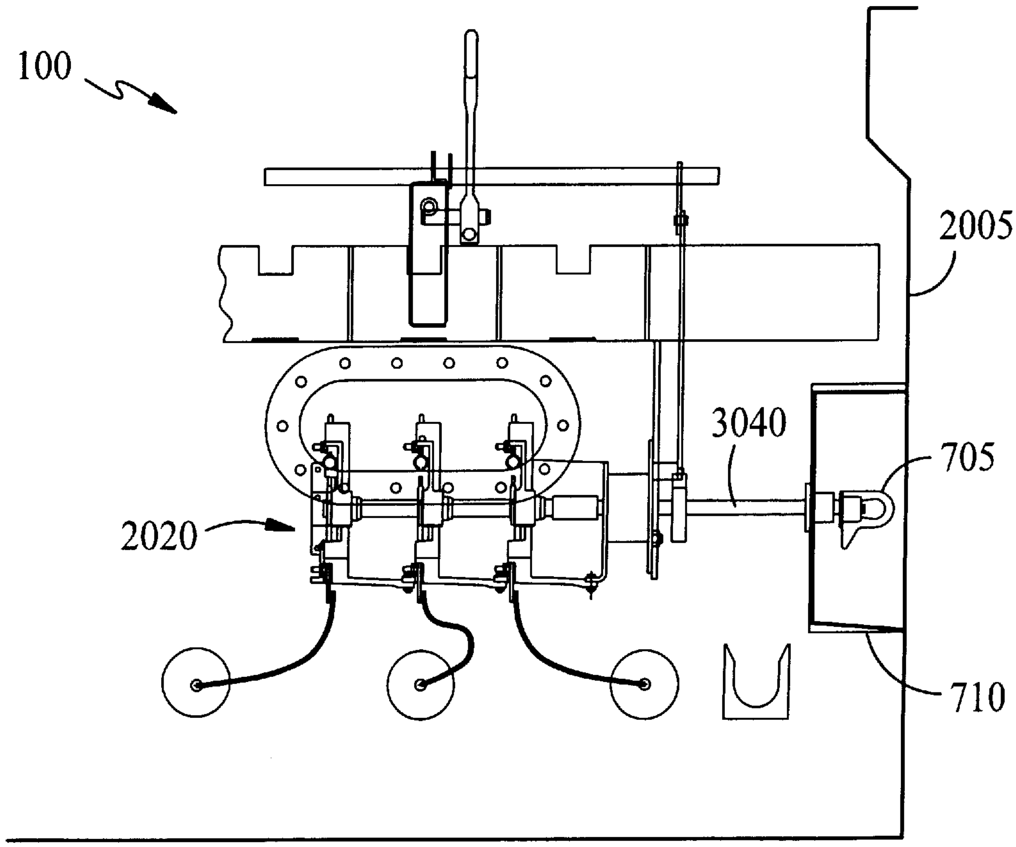
Figure 8A:
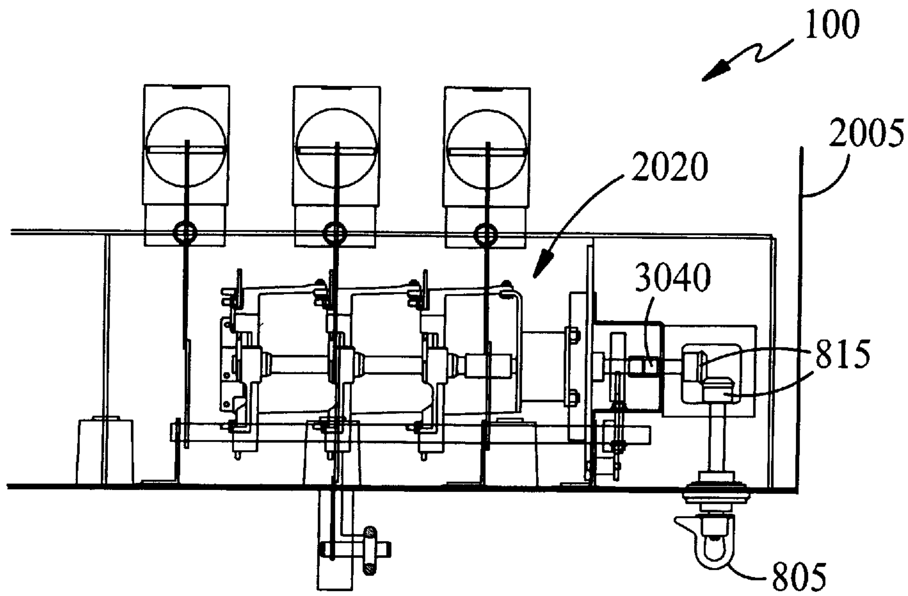
FIGS. 8A and 8B are schematic drawings of a top view and front view, respectively, of a high voltage switchgear including a cam-type safety interlock mechanism in which a safety switch is operable by a rotary handle located on a front plate of the tank.
Figure 8B:
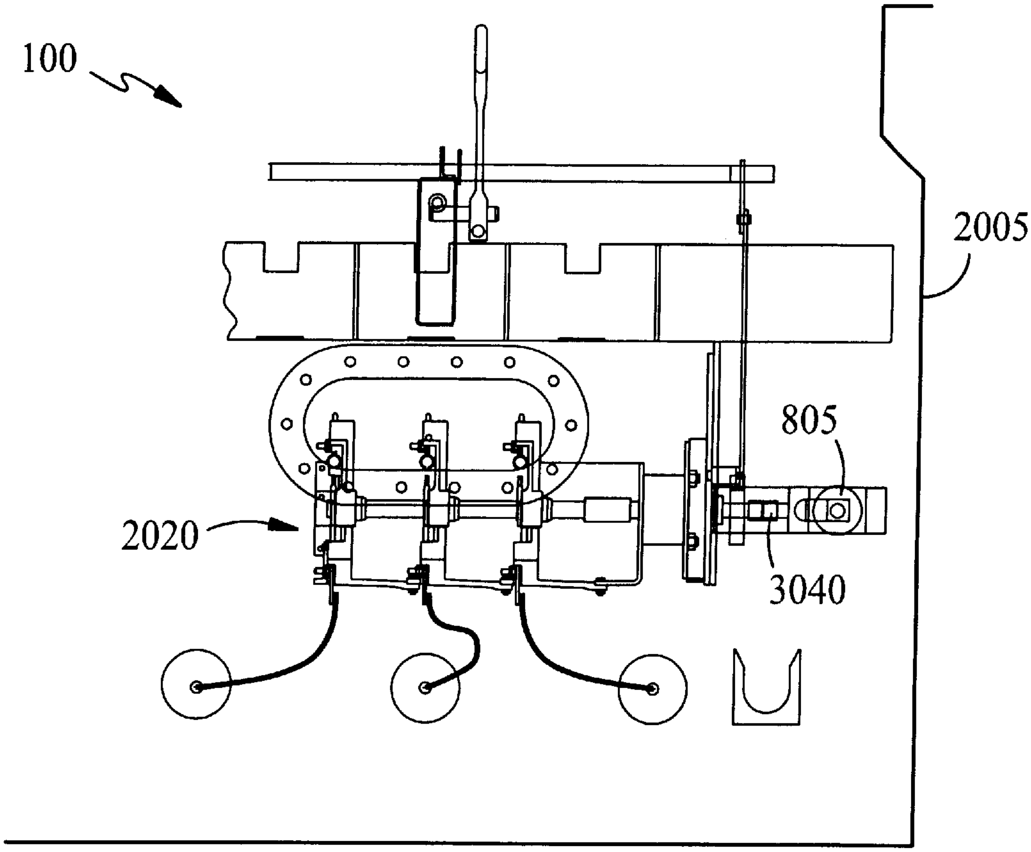

Alternatively, referring to FIGS. 7A and 7B, the safety switch 2020 may be operated by a first rotary handle 705 located on the side of the tank 2005, or in a recess 710 in the side of the tank 2005, and linked directly to the stub shaft 3040 of the safety switch 2020. Referring to FIGS. 8A and 8B, the safety switch 2020 also may be operated by a second rotary handle 805 located on the front of the tank 2005, or in a recess (not shown) in the side of the tank 2005, and linked to the stub shaft 3040 of the safety switch 2020 by bevel gears 815 to transmit rotational motion of the second rotary handle 805 to the stub shaft 3040.

Referring again to FIG. 3, the lever handle mechanisms 3011, 3031 of the vacuum switch 2015 and the safety switch 2020 may be interlocked using a rod and a notched moveable body, such as, for example, a cam interlock mechanism. The cam interlock mechanism may include an annular cam 3072 attached to the stub shaft 3040 of the safety switch 2020. A notch 3074 may be removed from the annular cam 3072. The notch 3074 may include, for example, a radial cut parallel to a longitudinal axis of the cam 3072 and stub shaft 3040 that creates an approximately right angle step in the surface of the cam 3072 relative to a direction of rotation of the cam 3072.

The cam interlock mechanism also may include a rod (e.g., locking rod 3076) pivotally connected to a first interlock pivot 3078 on a first end and configured to substantially contact the cam 3072 with a second contact end **3076*a***.

Figure 9A:
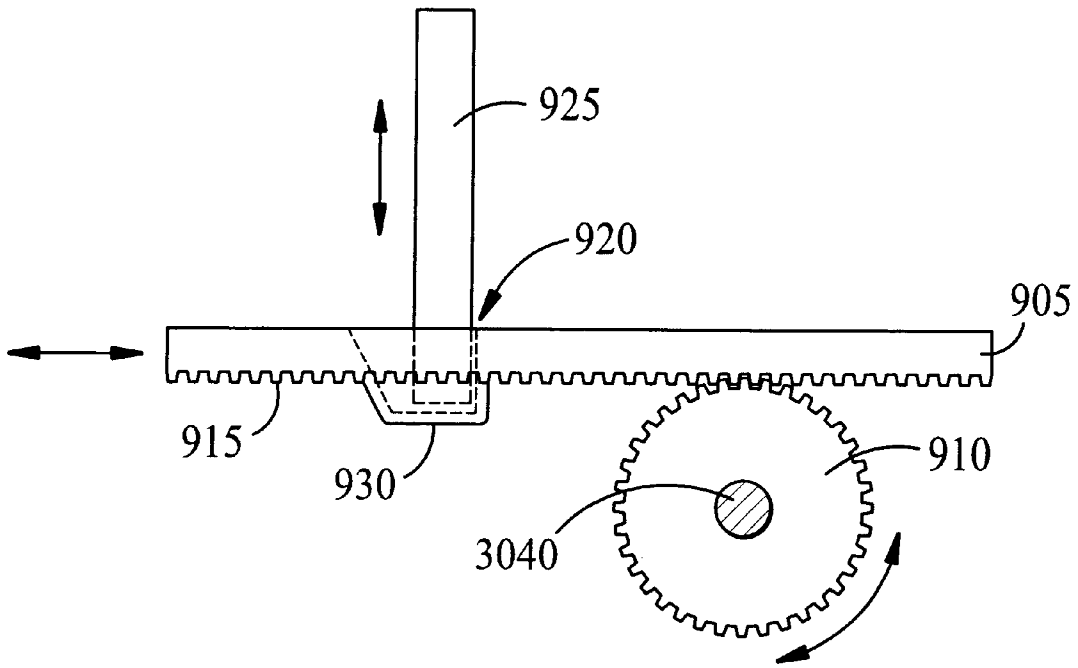
FIGS. 9A and 9B are schematic drawings of side views of a planar-structure type safety interlock mechanism including an indented notch (FIG. 9A) and a cut-through notch (FIG. 9B).
Figure 9B:
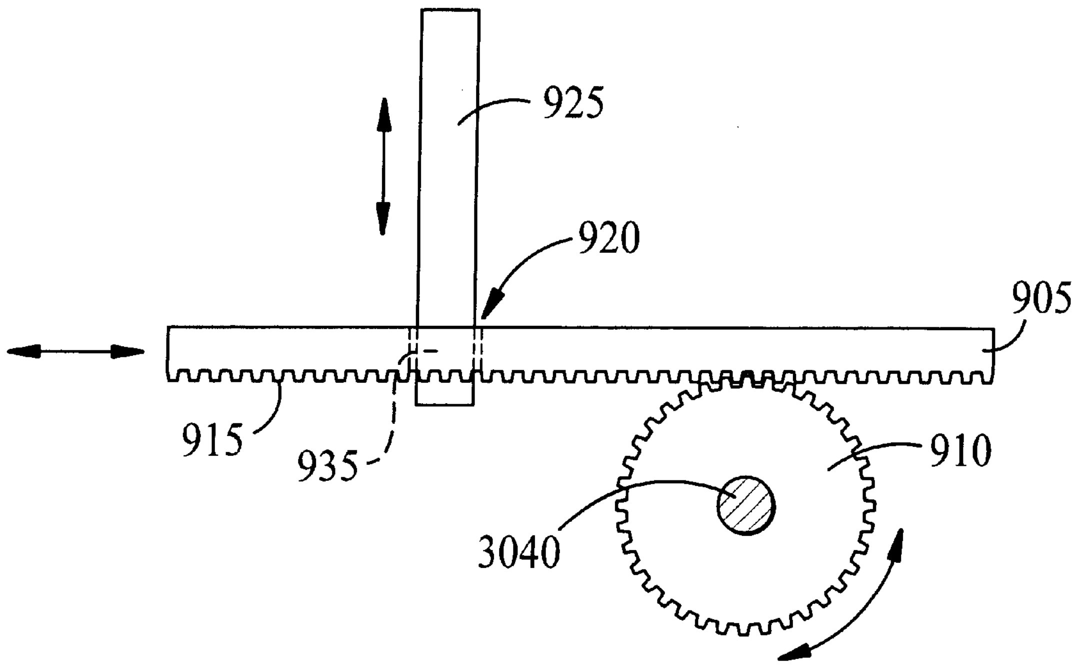

Referring now to FIGS. 9A and 9B, other interlock implementations may include, for example, a longitudinally moveable planar structure 905 directed in motion by a gear 910 connected to the stub shaft 3040. The gear 910 may be coupled to the planar structure 905 through gear teeth 915 in the planar structure 905. The planar structure 905 may include a notch 920 and a rod 925 may be configured to move vertically with respect to the planar structure 905 to engage or disengage the notch 920, when the rod is in an engagement position, e.g., in alignment with the notch 920. The notch 920 may include, for example, an indentation 930 in the planar structure 905 as illustrated in FIG. 9A, or a cut-through 935 in the planar structure 905, as illustrated in FIG. 9B.

Figure 10A:
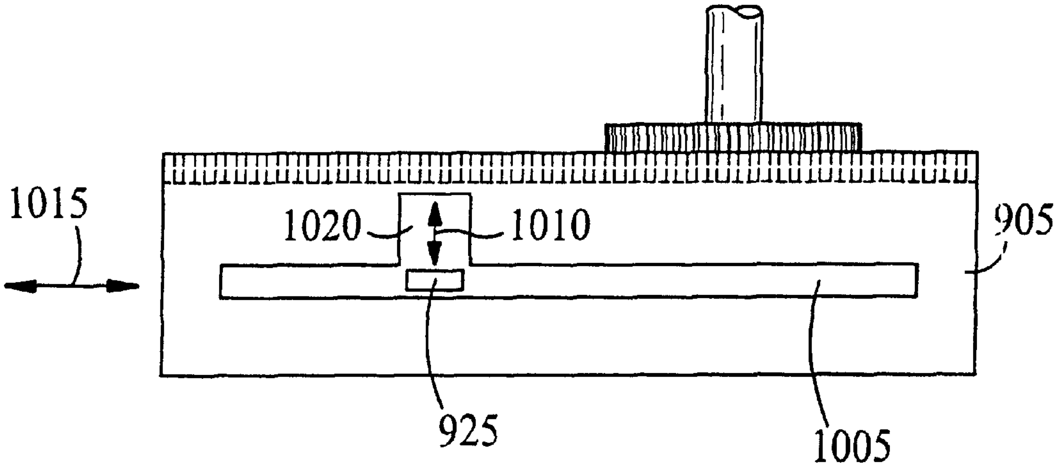
FIGS. 10A and 10B are schematic drawings of a top view and side view, respectively, of a planar-structure type safety interlock mechanism that includes a longitudinal slot with a lateral notch configured to engage the rod.
Figure 10B:
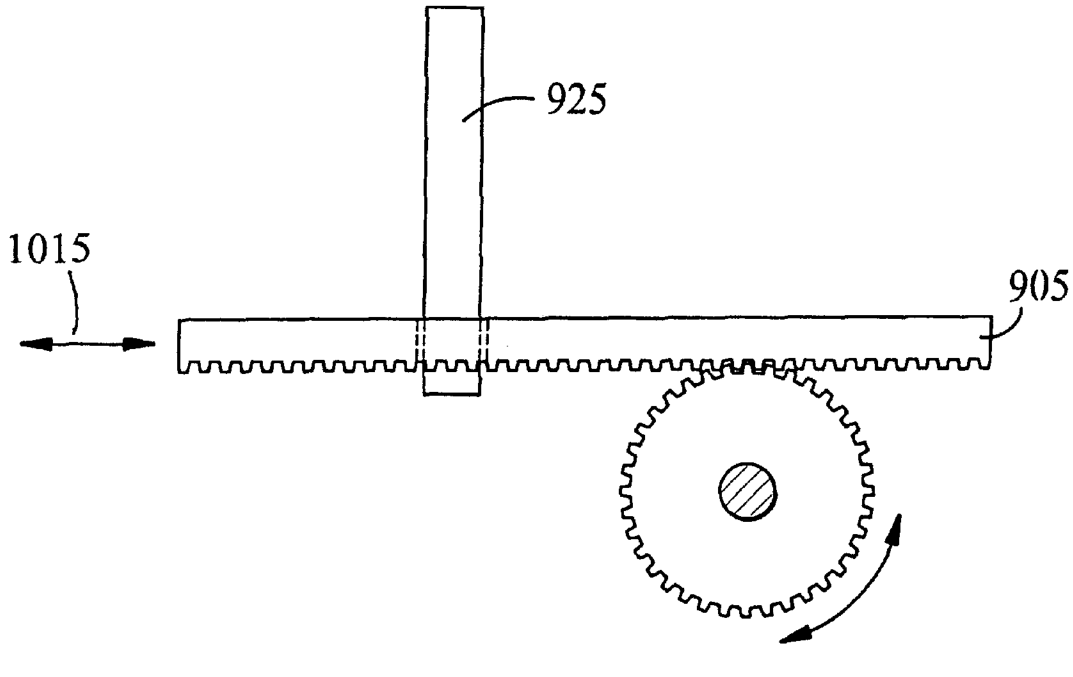

In yet another implementation, referring to FIGS. 10A and 10B, the planar structure 905 includes a slot 1005 that runs approximately the length of the planar structure 905 and penetrates through the planar structure 905. In this implementation, the rod 925 is configured to rest in the slot 1005 as the planar structure 905 moves longitudinally. Nevertheless, the rod 925 may be configured to move laterally 1010 with respect to a longitudinal direction of motion 1015 of the planar structure 905 to allow the rod 925 to engage or disengage a lateral notch 1020 (shown in FIG. 10A) in the slot 1005 when the rod 925 is in an engagement position, e.g., in alignment with the notch 1020.

Referring again to the cam interlock mechanism of FIG. 3, an interlock linkage 3080 may be configured to engage the rod, (e.g., the contact end **3076*a* of the locking rod 3076) when the vacuum switch 2015 is closed by raising vacuum lever 3011 and, referring again to FIG. 4, to raise the contact end 3076*a* of the locking rod 3076 when the vacuum switch 2015 is opened by lowering vacuum lever 3011**.

FIG. 3 shows that the interlock linkage 3080 may interface to, for example, the vacuum stay link 3017 that connects the support bracket 3019 to the second vacuum link 3014. The vacuum stay link 3017 may be non-rotatably connected to a linkage shaft 3082 that is rotatably connected to the support bracket 3019. The linkage shaft 3082 may be non-rotatably connected to a first end of a first linkage link 3084. A second end of the first linkage link 3084 rotatably connects, in turn, to a first end of a second linkage link 3086. A second end of the second linkage link 3086 pivotably connects to an intermediate point on the locking rod 3074.

Referring now to FIG. 4, opening the vacuum switch 2015 causes the second vacuum link 3014 to move generally horizontally toward the vacuum switch 2015. The horizontal motion of the second vacuum link 3014, in turn, causes a counterclockwise rotation of the vacuum stay link 3017 that is transmitted to the first linkage link 3084 by the linkage shaft 3082. The counterclockwise rotation of the first linkage link 3084 induces a generally upward motion in the second linkage link 3086. The upward motion of the second linkage link 3086 induces a counterclockwise rotation in the locking rod 3076, which lifts the contact end **3076*a* of the locking rod 3076 from the cam 3072. Closing the vacuum switch 2015 acts, in like manner, to lower the contact end 3076*a* of the locking rod 3076 into contact with the cam 3072**.

Referring again to FIG. 3, in an initial state, the contact end **3076*a* of the locking rod 3076 may rest (engage) in the notch 3074 when the notch 3074 is in an engagement position, e.g., aligned with the locking rod 3076. Engagement of the locking rod 3076 and the notch 3074 indicates that both the vacuum switch 2015 and the safety switch 2020 are closed. So positioned, the contact end 3076*a* of the locking rod 3076 precludes counterclockwise rotation of the cam 3072 and the stub shaft 3040. There also may be included a limit stop (not shown) to prevent the stub shaft 3040 from rotating clockwise from the closed position of the safety switch 2020 (shown in FIG. 3) and/or counterclockwise from the ground position of the safety switch 2020 (shown in FIG. 11). Hence, the safety switch 2020 is effectively prevented from being switched open while the vacuum switch 2015** is closed.

Figure 11:
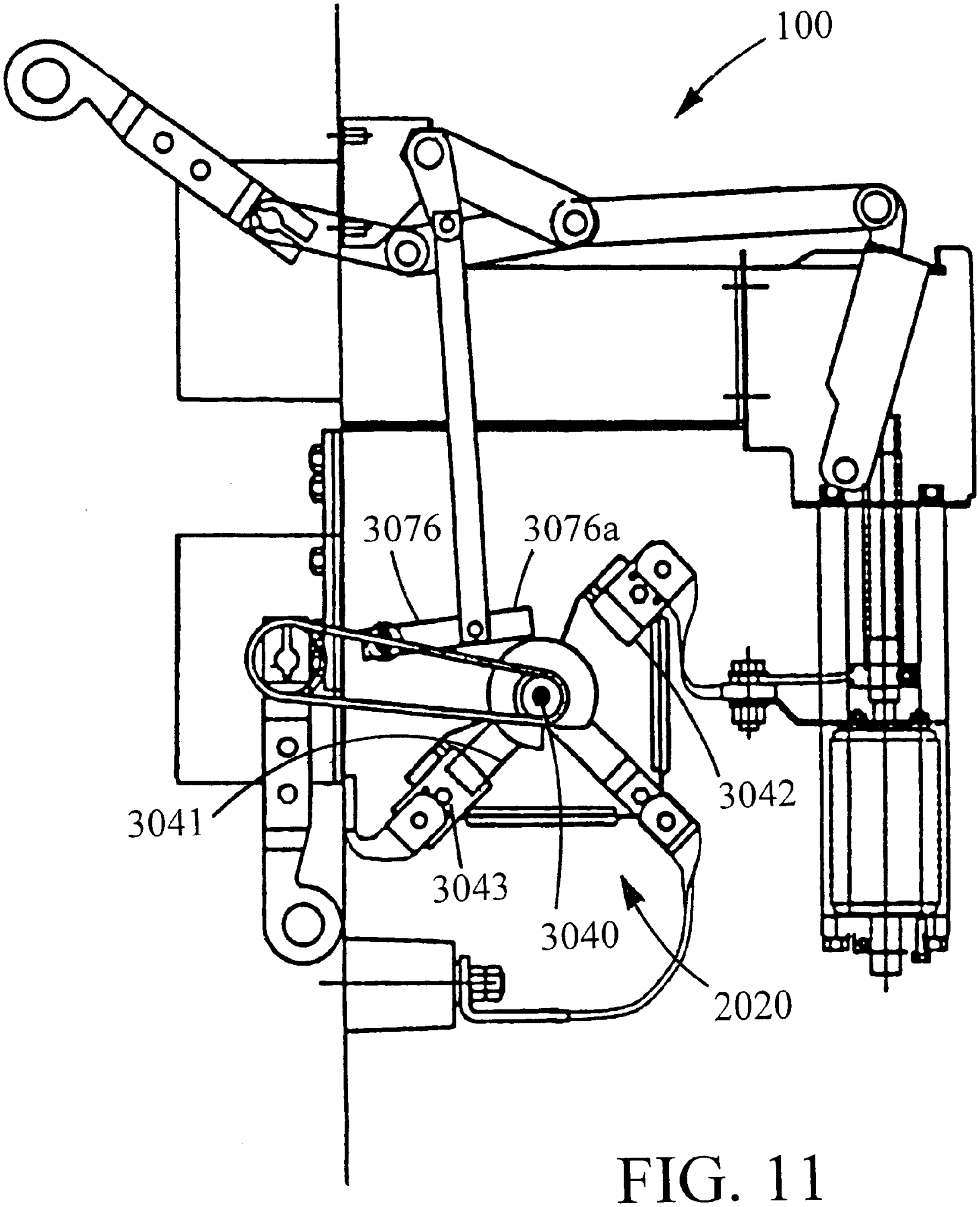
FIG. 11 is a schematic drawing of a side view of a high voltage switchgear including a cam-type safety interlock mechanism, an open vacuum switch, and a safety switch, at ground position and operable by a lever handle.

Alternatively, referring again to FIG. 4, the contact end **3076*a* of the locking rod 3076 may be raised out of contact with the cam 3072 by the vacuum switching mechanism 3010 and the interlock linkage 3080, thus indicating that the vacuum switch 2015 is open. Referring to FIGS. 6 and 11, from the raised position, the contact end 3076***a* of the locking rod 3076 permits the stub shaft 3040 to rotate to the open, or ground position of the safety switch 2020.

When the safety switch 2020 is open or grounded, the notch 3074 is in a position rotated counterclockwise from the contact end 3076*a* of the locking rod 3076, and the contact end 3076*a* of the locking rod 3076 is presented with a full radius of the cam 3072. Hence, when the safety switch 2020 is open or grounded, the full radius of the cam 3072 stops downward motion of the contact end 3076*a* of the locking rod 3076 and prevents the vacuum switching mechanism 3010 from closing the vacuum switch 2015 while the safety switch 2020 is open or grounded.

The alternative interlock implementations of FIGS. 9A–10B may be linked to operations of the primary high voltage switch and the secondary safety switch in a fashion analogous to that illustrated for the cam interlock mechanism.

Other implementations are within the scope of the following claims.

What is claimed is:

1. A mechanism to ensure that a first switch does not switch to a first position unless a second switch is in a second position, and that the second switch does not switch from the second position while the first switch is in the first position, the mechanism comprising:

- a moveable body with a notch structured and arranged to associate a position of the moveable body with a switching of the position of the second switch, wherein the associated position of the moveable body locates the notch in an engagement position when the second switch is in a second position and locates the notch out of the engagement position when the second switch is not in the second position;
- a moveable rod structured and arranged to engage the notch of the moveable body when a first switch is in a first position and to disengage the notch of the moveable body when the first switch is switched from the first position, wherein, when the moveable rod engages the notch of the moveable body, the moveable rod blocks movement of the moveable body in a first direction to prevent the second switch from switching from the second position, and when the notch of the moveable body is not in the engagement position so that the moveable rod cannot engage the notch, the first switch is prevented from switching to the first position.

2. The mechanism of claim 1 wherein the first position of the first switch corresponds to a closed position of the first switch.

3. The mechanism of claim 2 wherein the second position of the second switch corresponds to a closed position of the second switch.

4. The mechanism of claim 1 wherein the first switch comprises a primary vacuum switch.

5. The mechanism of claim 4 wherein the second switch comprises a secondary safety switch.

6. The mechanism of claim 5 wherein the secondary safety switch is capable of being switched between a closed position, an open position, and a ground position.

7. The mechanism of claim 5 wherein the secondary safety switch comprises an oil immersed switch.

8. The mechanism of claim 5 wherein the secondary switch comprises a switch immersed in sulfur hexaflouride gas.

9. The mechanism of claim 1 wherein the moveable body comprises a rotatable cylinder.

10. The mechanism of claim 9 wherein the notch comprises a radial notch in the rotatable cylinder and is configured to present an 85° to 95° angle to the moveable rod.

11. The mechanism of claim 1 wherein the moveable body comprises an annular cam connected to a rotatable shaft.

12. The mechanism of claim 11 wherein the notch comprises a radial notch into the annular cam and is configured to present an 85° to 95° angle to the moveable rod.

13. The mechanism of claim 9 wherein the rod compromises a rod rotably attached to a pivot point at a first end and structured and arranged to rotate into or out of the notch when the notch is in an engagement position.

14. The mechanism of claim 1 wherein a first switching mechanism is structured and arranged to switch the first switch.

15. The mechanism of claim 14 wherein a second switching mechanism is structured and arranged to switch the second switch.

16.The mechanism of claim 15 wherein a first linkage mechanism is structured and arranged to link the movement of the moveable rod to the operation of the first switch.

17. The mechanism of claim 16 wherein a second linkage mechanism is structured and arranged to link the movement of the moveable body to the operation of the second switch.

18. The mechanism of claim 17 wherein the second linkage mechanism comprises a stub shaft of the second switch.

19. A mechanism to ensure that a first switch does not switch to a first position unless a second switch is in a second position, and that the second switch does not switch from the second position while the first switch is in the first position, the mechanism comprising:

- a first interlock means structured and arranged to associate a position of a notch with a switching of the second switch, wherein the first interlock means positions the notch in an engagement position when the second switch is in a second position and positions the notch out of the engagement position when the second switch is not in the second position;
- a moveable second interlock means structured and arranged to engage the notch positioned by the first interlock means when the first switch is in a first position and to disengage the notch positioned by the first interlock means when the first switch is switched from the first position;

wherein:

when the moveable second interlock means engages the notch positioned by the first interlock means, the second switch is prevented from switching from the second position, and when the notch positioned by the first interlock means is not positioned in the engagement position, the moveable second interlock means cannot engage the notch and the first switch is prevented from switching to the first position.

* * * * *